Figure 1:
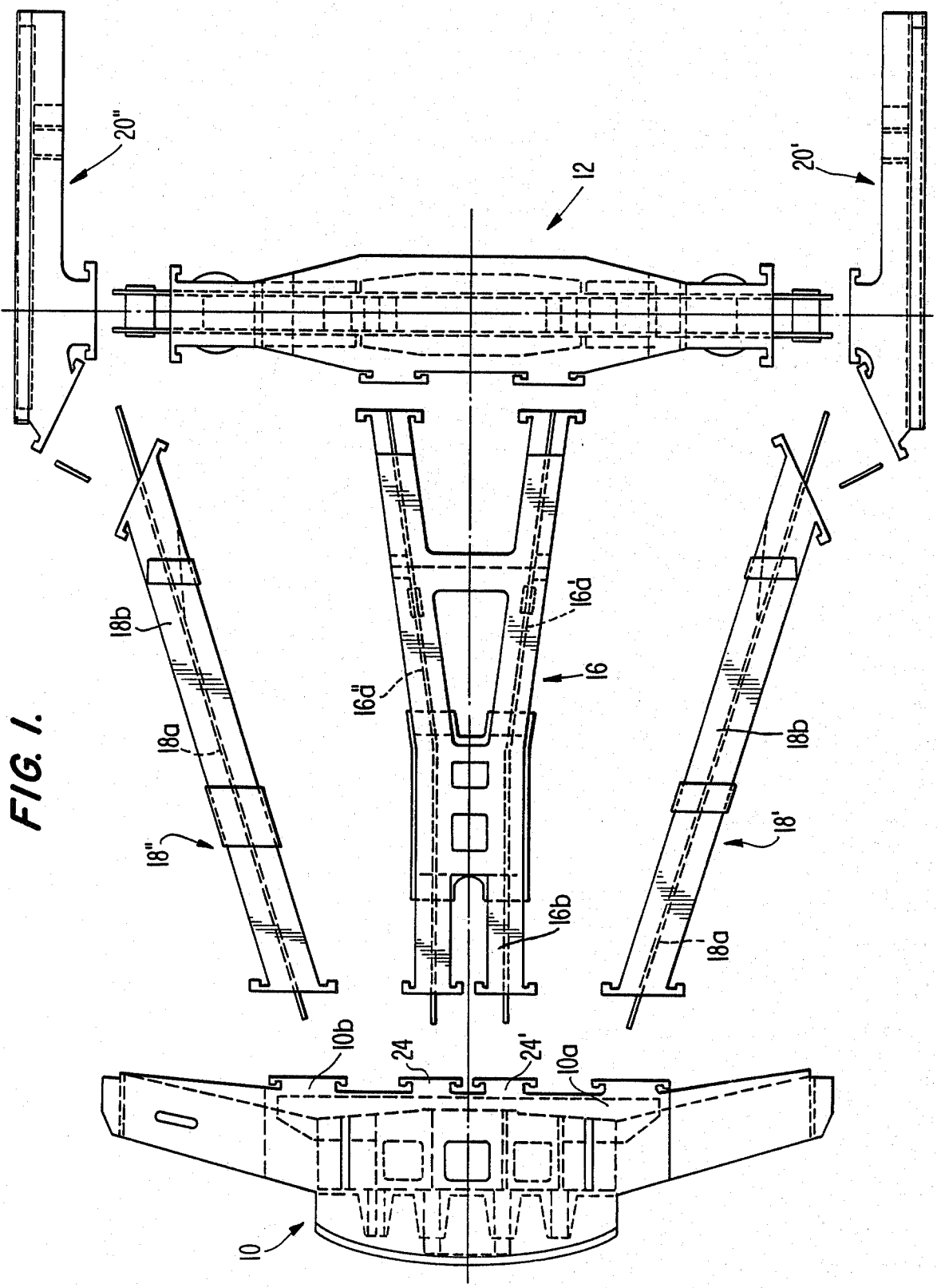

United States Patent [19]
Rimbaud

[11] Patent Number: 4,778,098
[45] Date of Patent: Oct. 18, 1988

[54] PROCESS FOR MECHANICAL/WELDED ASSEMBLY OF CHASSIS ELEMENTS FOR RAILWAY VEHICLES

[75] Inventor: Michel Rimbaud, Le Breuil, France

[73] Assignee: Jeumont-Schneider Corporation, Puteaux cedex, France

[21] Appl. No.: 932,870

[22] Filed: Nov. 18, 1986

[30] Foreign Application Priority Data

Nov. 19, 1985 [FR] France ................................ 85 17052

[51] Int. Cl.⁴ .............................................. B23K 31/02
[52] U.S. Cl. ................................. 228/159; 228/160; 228/170; 228/171; 228/182
[58] Field of Search ............... 228/170, 171, 159, 160, 228/182; 29/150, 462, 469, DIG. 48; 105/414; 403/168, 167; 52/664

[56] References Cited

U.S. PATENT DOCUMENTS

| | | | |
|---|---|---|---|
| 1,655,947 | 1/1928 | Gallowitz | 228/171 |
| 2,437,598 | 3/1948 | Goldberg | 228/170 |
| 2,646,009 | 7/1953 | Dean | 105/420 |
| 3,508,322 | 4/1970 | Shaw | 228/171 |
| 3,926,530 | 12/1975 | Deller | 403/167 |

FOREIGN PATENT DOCUMENTS

| | | | |
|---|---|---|---|
| 306087 | 3/1973 | Austria | 105/420 |
| 489119 | 12/1952 | Canada | 228/171 |
| 1605109 | 1/1971 | Fed. Rep. of Germany | 105/420 |
| 171056 | 11/1984 | Japan | 228/19 |

Primary Examiner—M. Jordan
Assistant Examiner—Samuel M. Heinrich
Attorney, Agent, or Firm—Rines and Rines, Shapiro and Shapiro

[57] ABSTRACT

The invention concerns a process for assembly of the end of a girder (16,18',18",20', 20"and the associated region of a crossbrace (10,12), constituting components of the chassis end of a railway vehicle, with the girder and crossbrace each comprising at least one vertical web and upper and lower flanges. According to the invention, the flanges of the girder are cut away such that its web extends longitudinally beyong the edges of the flanges. Then the flanges of the crossbrace are cut so as to form attachment journals with free edges adapted to the respective free edges of the flanges of the girder, at the same time, forming in the region of the free edges, hook-shaped lateral appendages. The crossbrace and girder are positioned so that the respective free edges of the flanges of the crossbrace and the girder essentially abut one another, and the girder and crossbrace are welded together in the regions of mutual contact.

8 Claims, 2 Drawing Sheets

PROCESS FOR MECHANICAL/WELDED ASSEMBLY OF CHASSIS ELEMENTS FOR RAILWAY VEHICLES

The present invention concerns in a general way the chassis of railway vehicles, and more particularly a process of assembly of the elements of the end of a chassis of a railway vehicle such as a subway car.

The chassis of railway vehicles are conventionally fabricated using girders of metal (most often rustproof steel), cut and assembled by welding, in conventional fashion. The portion under greatest strain is termed the "chassis end," and is constructed of "black steel."

The invention provides a simpler and more reliable process of assembly of these chassis ends, in particular of the girders and crossbraces of which they are constituted.

According to the present invention, a process is proposed for assembly of the end of a girder and the associated region of a crossbrace, these two metal elements being components of a chassis end of a railway vehicle, with the girder and crossbrace each having at least one vertical web and substantially horizontal upper and lower flanges. This process is most preferably characterized by the following steps:

cutting the upper and lower flanges of the girder in such a way that its web extends longitudinally beyond the edges of the free end of each flange;

cutting the upper and lower flanges of the crossbrace so as to form a boss for attachment, that is, projecting portions having free edges conforming to the respective free edges of the upper and lower flanges of the girder, at the same time forming, in the region of those free edges, lateral appendages with essentially a hook form;

positioning the girder and crossbrace in such a way that the respective free edges of the respective flanges of the girder and the crossbrace substantially abut one another;

welding the girder to the crossbrace in the regions of their mutual contact, and cutting away the lateral appendages after welding of the girder to the crossbrace.

Figure 2:
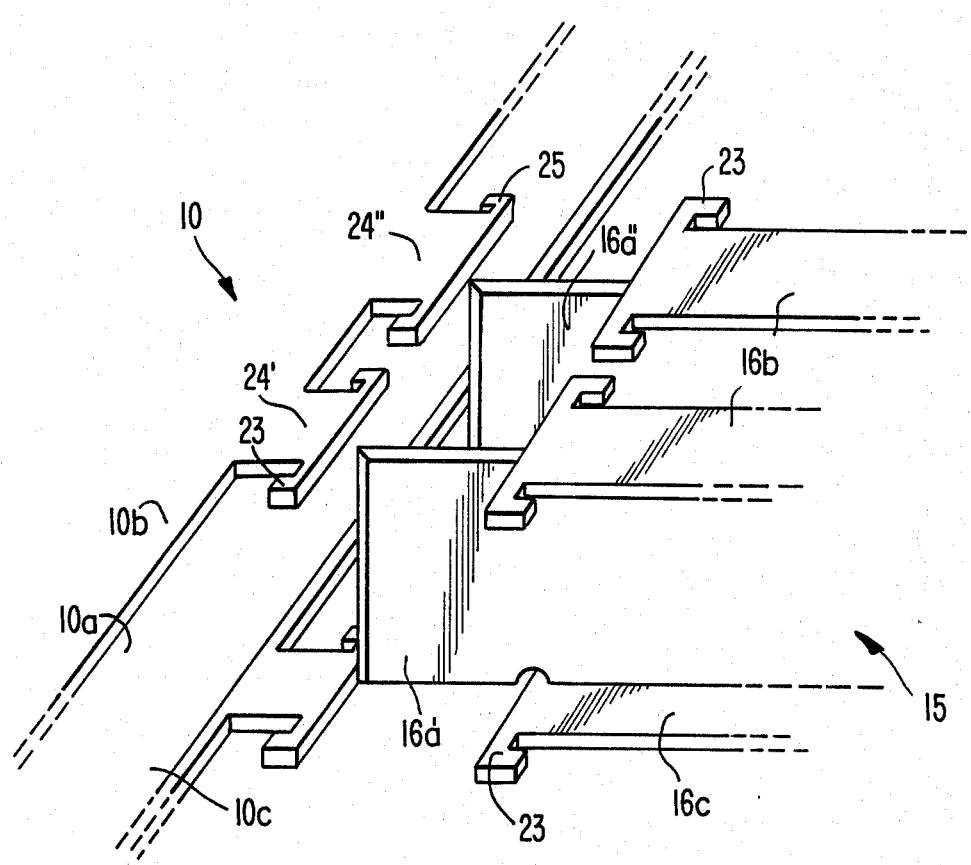

The invention will be made clearer by the following description of a preferred mode of embodiment, given by way of example, with reference to the appended drawing, in which:

FIG. 1 is an exploded top view of the elements constituting the chassis end to which the process of the invention is to be applied, and FIG. 2 is a detailed perspective view better illustrating the process itself.

Referring to the drawing of FIG. 1, a chassis end of a railway vehicle, in particular a subway car, comprises a head brace 10, which displays a form curved slightly toward the footboards. The head brace 10 is constructed by first cutting away the plates which are to form the web and flanges of the crossbrace, and then welding these elements, to form a box structure. There is in addition a so-called "pivot" brace 12, which extends parallel to the head brace 10, and which is constructed in essentially the same manner.

A central girder 16 is constituted by two vertical webs 16'a, 16"a angled toward one another, approaching the head brace 10. The central girder also has, welded solidly to the webs, two horizontal plates forming upper and lower flanges (the upper flange being indicated at 16b in FIG. 1).

There are in addition two oblique girders 18' and 18", to either side of the central girders, each presenting a transverse section in the form of an inverted double "T," so as to define a web 18a and upper and lower flanges (the upper flange being indicated at 18b in FIG. 1).

Finally, the assembly includes two lateral elements 20', 20" in the form of U-section girders. These elements 20', 20" extend longitudinally, that is, essentially perpendicular to the "pivot" brace 12.

As shown in the exploded plane view of FIG. 1, the elements described above are intended to be assembled in the following manner. The pivot brace 12 is fixed between the lateral girders 20', 20". The central girder is fixed centrally between the braces 10 and 12, in the median plane of the assembly. Finally, the oblique braces 18', 18" are adapted to be fixed between the respective lateral regions of the head brace 10 and the anterior end of each of the lateral girders, 2' and 20" respectively.

According to the present invention, referring more particularly to FIG. 2, the assembly of the elements as constituting the front portion of the chassis of a railway vehicle is realized as follows. For simplification of description, only the region of the assembly between the medial region of the head brace 10 and the corresponding end of the central girder 16 has been represented in FIG. 2.

According to the process of the invention, first the upper and lower flanges of the double girder 16 are cut away, in the present example by means of a plasma torch, in such a way that the two parallel webs 16'a, 16"a of this girder extend longitudinally beyond the terminal edges of the flanges 16b, 16c. In FIG. 2 it can be seen that the region of the free end of each of the flanges 16b, 16c has lateral appendages 23, roughly in an "L" or hook shape.

In the associated region of the head brace 10, the flanges 10b, 10c of the brace are cut away, again for example by means of a plasma torch, so as to form attachment bosses indicated at 24', 24". It can also be seen that each boss has two laterally projecting appendages 25, similar to the appendages 23, and complementary to them, for purposes explained below.

The following stage of the process involves welding together the end of the girder 16 to the associated region of the head brace 10, after first bringing the respective rectilinear edges of the flanges of the girder and the bosses provided on the brace substantially into abutment against one another, with the free ends of the webs 16'a, 16"a being inserted between the upper and lower flanges of the brace, to come into contact with the web 10a of the brace 10.

It can be noted here that the appendages 23, 25 mentioned above make it possible, advantageously, to eliminate the start and end of each weld, the start and end being susceptible to defects.

At the conclusion of welding, the appendages are eliminated, for example by being cut off with a gas torch.

The plates are dressed with a girder in the area of the cut, to bring them to the desired shape, and to give them a good surface condition to improve the fatigue resistance of the construction.

The process of mechanical/welded assembly described above is applicable to the assembly of all of the elements of the chassis as described above, as can be appreciated in particular from the FIG. 1 illustration of the ends of the girders 16, 18', 18" and the corresponding regions of the braces 10, 12 and the lateral girders 20', 20".

Of course, the present invention is in no way restricted to the embodiment described above, but includes all variations of embodiment within the scope of the appended claims.

I claim:

1. A process for use in assembling a railway vehicle chassis, comprising the following steps:
    providing a girder and crossbrace for a railway vehicle chassis end, the girder and crossbrace each having a substantially vertical web, a substantially horizontal upper flange joined to an upper part of the web, and a substantial horizontal lower flange joined to a lower part of the web and opposed to the upper flange,
    cutting the upper and lower girder flanges at one longitudinal end of the girder such that a corresponding end of the girder web extends longitudinally beyond resulting cut end edges of the girder flanges,
    cutting the upper and lower flanges of the crossbrace at one side of the crossbrace to form upper and lower attachment bosses with edges complementary to the cut end edges of the girder flanges,
    positioning the girder and crossbrace such that the cut end edges of the girder flanges substantially abut the complementary edges of the attachment bosses, and
    welding the substantially abutted portions of the girder and crossbrace together.

2. The process of claim 1, wherein the girder and crossbrace are positioned such that said end of the girder web substantially abuts the web of the crossbrace.

3. The process of claim 1, wherein the cutting steps are performed with a plasma torch.

4. The process of claim 1, wherein the girder flanges are cut so as to form generally hook-shaped lateral appendages which define opposite end portions of said cut end edges, the crossbrace flanges are cut so as to form generally hook-shaped lateral appendages which define opposite end portions of said edges of the attachment bosses, and the appendages of the girder flanges are welded to the appendages of the attachment bosses, and further comprising cutting off the welded appendages.

5. A railway vehicle chassis having at least one girder and crossbrace assembled in accordance with the process of claim 1.

6. A process of joining a girder to a crossbrace, comprising the following steps:
    providing a girder and a crossbrace each having a longitudinal web and a pair of substantially parallel flanges joined to the web and projecting substantially perpendicular to the web along at least one side thereof,
    cutting the girder flanges off transversely at one end of the girder such that a corresponding end of the web projects longitudinally beyond resulting cut end edges of the girder flanges,
    cutting the crossbrace flanges at one side of the crossbrace to form attachment bosses with edges directed laterally of the crossbrace and complementary to the cut end edges of the girder flanges,
    positioning the girder and crossbrace to substantially abut the cut end edges of the girder flanges with the complementary edges of the attachment bosses, and
    welding the substantially abutted portions of the girder and crossbrace together.

7. The process of claim 1, wherein the girder and crossbrace are positioned such that said end of the girder web substantially abuts the web of the crossbrace.

8. The process of claim 1, wherein the girder flanges are cut so as to form generally hook-shaped lateral appendages which define opposite end portions of said cut end edges, the crossbrace flanges are cut so as to form generally hook-shaped lateral appendages which define opposite end portions of said edges of the attachment bosses, and the appendages of the girder flanges are welded to the appendages of the attachment bosses, and further comprising cutting off the welded appendages

* * * * *